Patented May 23, 1944

2,349,293

UNITED STATES PATENT OFFICE 2,349,293

BACTERIA ANTIGEN FOR THE TREATMENT OF DIPHTHERIA

Orry Charles Morrison, Carroll, Iowa

No Drawing. Application May 2, 1938, Serial No. 205,623

7 Claims. (Cl. 167—78)

This invention relates to a bacteria antigen for the treatment of diphtheria, a method of preparing the same, and a method of treatment for and immunizing against diphtheria.

This application is a continuation-in-part of my copending application Serial No. 9,914 filed March 7, 1935, which was a continuation-in-part of my then copending application Serial No. 510,480 filed January 23, 1931.

In preparing the antigen material, the diphtheriae bacilli are grown in mass culture on a media of beef infusion agar containing 1 percent dextrose and 20 percent sterile beef blood serum. The serum is added after the media has been sterilized and while still in the liquid state. The solidified media is then tested for sterility by incubating at 37.5° C. for 24 hours.

The culture used was one obtained from Parke Davis and Co., and the strain was kept up by transplanting the cultures twice a week on Loffler's coagulated blood serum medium. The usual microscopic examinations and morphological tests were made before transplanting to mass culture bottles. It is then streaked on the agar slants by means of a platinum loop wire, care being taken to isolate some into the liquid which collects at the bottom of the bottle. It is incubated at 37.5° C. and at intervals the liquid at the bottom of the bottle is spread over the surface of the slant until the entire slant is covered with growth. If any evidence of contamination appears, the bottle is carefully checked and discarded if not pure.

When the growth is judged to be sufficient, which is usually after about 36 hours, the bacteria are washed off the media by means of sterile saline solution and by gently rubbing the slant surface with a wire triangle. The emulsion of bacteria is then removed with a sterile pipette and centrifuged in a sterile tube. The bacteria are then washed five times or more in physiological sterile saline solution until there is no culture media present.

The bacteria are then removed and placed in a dryer at 56° C., in which they are all killed by the heat. The time necessary for drying is determined by the quantity of bacteria present.

When the material appears to be dry, it is weighed and then returned to the oven for 24 hours and then reweighed. If the weight remains the same as the day before, the material is then ready for treating in a ball mill.

The sterile physiological saline solution is added to the dried bacteria after they have been weighed so that there will be 1000 cc. of saline solution for each gram of dried bacteria. The mixture is now placed in the ball mill. A suitable preservative, preferably phenol, is added. If phenol is used, the percentage is 0.5%. The jar is properly corked and then turned at the speed of 70 revolutions per minute for a period of 60 hours. The material is then removed from the ball mill and passed through a fine Berkefeldt filter, in which all parts of bacteria or bacterial bodies are removed. If the grinding has been sufficient, there normally will not be any whole bacterial bodies.

The filtrate is tested for sterility by inoculating 1 cubic centimeter into a Smithe fermentation tube. Normally three tubes are employed and these are incubated for seven days. If the filtrate is found to be sterile, it is then bottled into sterile bottles and a sample taken at random from three of these bottles and tested. The tests should be at the rate of at least 2% of the bottles made up. Should these be found to be sterile, then the antigen is ready for use. If any of them are not sterile, the entire amount is refiltered and the steps repeated.

The antigen is stored in a refrigerator at 40° F. awaiting use.

The heat treatment of the bacteria, particularly while moist, results in the precipitation of the protein content thereof, and in the subsequent centrifugation and filtration, all protein matter is removed. As a result, the material is non-toxic and non-irritant and extraordinarily large doses of it may be employed without undesirable after-effects.

The dosage of material normally employed is 1 cc. of antigen given either subcutaneously or intravenously once each day. Much larger quantities, however, may be employed in immunizing from diphtheria. The preferred practice is first to determine susceptibility by the Shick test and then to administer antigen at the rate of 1 cc. per day for five successive days, after which susceptibility is again tested and if the patient is again susceptible, the injections are continued until the test is negative.

The antigen may likewise be used after the onset of the disease in the same manner, although in such case larger dosages may be desirable.

While the chemical and physiological aspects of the antigen are not completely understood, it is believed that the antigen comprises in large part material antipathetic to the bacterial enzymes.

The diphtheria bacteria exude enzymes which act upon the bodily tissues to digest the same and render them assimilable by the bacteria. The bacteria itself apparently contains a large excess of antipathetic material which protects the bacteria itself from solution or digestion. These anti-enzymes which act to build up the tissues rather than break them down, or at least prevent the breaking down of the tissues, will be called herein genzymes. The introduction of such material into the bodily tissues will naturally prevent the digestion thereof by the corresponding enzyme material and at the same time appears to hasten the rebuilding or reconstruction processes.

The foregoing detailed description is given for clearness of understanding only, and no unnecessary limitations should be understood therefrom, but the appended claims should be construed as broadly as permissible in view of the prior art.

I claim:

1. The method of producing immunizing material which comprises segregating a substantially pure culture of diphtheriae, multiplying the culture upon a protein medium, separating the resulting bacterial growth from the culture medium, subjecting the bacteria to a temperature of the order of 56° C. high enough to destroy them and to precipitate all protein matter therein, comminuting the bacteria, and removing all solid matter from the resulting ground material.

2. The method as set forth in claim 1 in which the bacteria are comminuted in the presence of a predetermined proportion of physiological salt solution.

3. The method of producing immunizing material which comprises segregating a substantially pure culture of diphtheriae, multiplying the culture upon a protein medium, separating the resulting bacterial growth from the culture medium, subjecting the bacteria to a temperature of the order of 56° C. high enough to destroy them and to precipitate all protein matter therein, drying and weighing the bacteria and adding a predetermined proportion of saline solution thereto, comminuting the bacteria, and removing all solid matter from the resulting ground material.

4. The method as set forth in claim 1 in which the bacteria are comminuted in the presence of an excess of physiological salt solution.

5. A diphtheriae immunizing preparation comprising a bacterial extract produced according to the method of claim 1.

6. A diphtheriae immunizing agent of predetermined strength and prepared according to the process of claim 3.

7. A diphtheriae immunizing agent of predetermined strength and prepared according to the process of claim 3 and in which the ratio of dried bacteria to saline solution is approximately 1 gram of bacteria per 1,000 ccs. of solution.

ORRY CHARLES MORRISON.